Jan. 22, 1952  A. E. REEVES  2,583,342
CONTINUOUS FILM PRINTER WITH AUTOMATIC CONTROL
OF ELECTROMAGNETICALLY ACTUATED
SHUTTER OPERATING MEANS
Filed Sept. 21, 1946  4 Sheets-Sheet 1

Fig. 1

INVENTOR
Arthur E. Reeves
BY John Flann
ATTORNEY

Jan. 22, 1952     A. E. REEVES     2,583,342
CONTINUOUS FILM PRINTER WITH AUTOMATIC CONTROL
OF ELECTROMAGNETICALLY ACTUATED
SHUTTER OPERATING MEANS Filed Sept. 21, 1946     4 Sheets-Sheet 3

INVENTOR
Arthur E. Reeves
BY John Flann
ATTORNEY

Patented Jan. 22, 1952

2,583,342

UNITED STATES PATENT OFFICE 2,583,342

CONTINUOUS FILM PRINTER WITH AUTOMATIC CONTROL OF ELECTROMAGNETICALLY ACTUATED SHUTTER OPERATING MEANS

Arthur E. Reeves, Los Angeles, Calif.

Application September 21, 1946, Serial No. 698,416

16 Claims. (Cl. 95—75)

This invention relates to apparatus for accurately determining the light requirements for photographic printing, and particularly for determining such requirements for printing colored motion picture film.

In a patent issued to Arthur E. Reeves on January 3, 1939, entitled "Photographic Exposure Tester" and bearing No. 2,142,413, an apparatus is shown by the aid of which the time of exposure, and the amount of light required for printing black and white motion picture film, can be determined accurately.

It is an object of this invention to provide an improved form of such apparatus, as well as one having a simplified mode of operation.

It is another object of this invention to provide such an apparatus having improved means for determining the time of exposure.

It is another object of this invention to provide apparatus by the aid of which the time of exposure and the amount, as well as the character, of the light required for printing colored film may be determined.

As is well understood, a finished negative in color, in addition to variations caused by the different light conditions of its exposure, may accentuate in an undesirable manner one or more of the colors composing the picture. For example, the picture may appear too red. Accordingly, it is another object of this invention to provide apparatus for determining in a simple manner the color correction to be applied in printing such a negative to produce a picture in which the colors are properly balanced.

It is another object of this invention to provide apparatus by the aid of which the correction to be applied in printing from a color negative by any one of several color filters, either alone, or in combination with other filters, may be determined readily.

It is still another object of this invention to provide apparatus by the aid of which the result of printing a color negative with different amounts of light, and with or without various color corrections, may be readily observed.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

Figure 1:
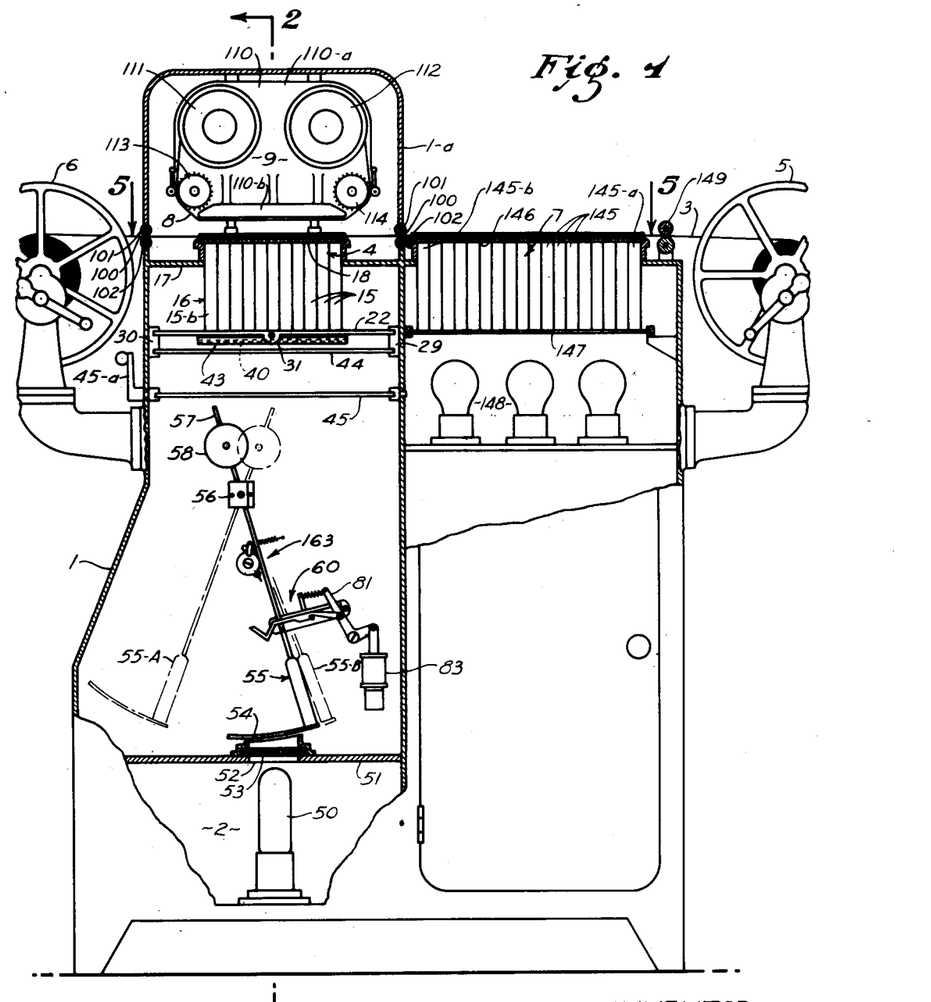
Figure 1 is a schematic sectional view, partly in elevation, illustrating apparatus incorporating the features of the invention.

Referring to the drawings, particularly Fig. 1, the apparatus is shown as comprising a light-tight housing 1, enclosing an accurately controlled light source 2. The finished negative for which the printing conditions are to be determined is indicated by 3, and passes over a series of printing openings 4 in the upper part of the housing 1. The film 3 may be carried by either of the reels 5 or 6, being wound from one to the other as the testing proceeds. To permit inspection of the negative 3 for choosing the portions to be tested, as well as to determine the character of the correction to be applied and to facilitate proper positioning of the negative with respect to the printing apertures 4, a series of viewing apertures 7 is provided exteriorly of the housing 1 and in definite spaced relation with respect to the series 4.

When a desired portion of the negative 3 has been positioned over the openings 4, light coming from the source 2, and controlled to provide various intensities and color characteristics, is caused to pass through the negative 3 for an accurately determined interval to affect raw film 8 carried by mechanism 9.

This mechanism 9 operates appropriately to bring the film 8 into printing contact with the negative 3 prior to the exposure, and thereafter to replace the exposed portion of the film 8 with an unexposed portion. After the entire film 8 has been exposed, it is removed and developed, the effects of the light being judged by visual observation or appropriate apparatus. Provisions for controlling printing of the entire negative are then made accordingly.

Figures 5, 6, 7, 8, 9, 10:
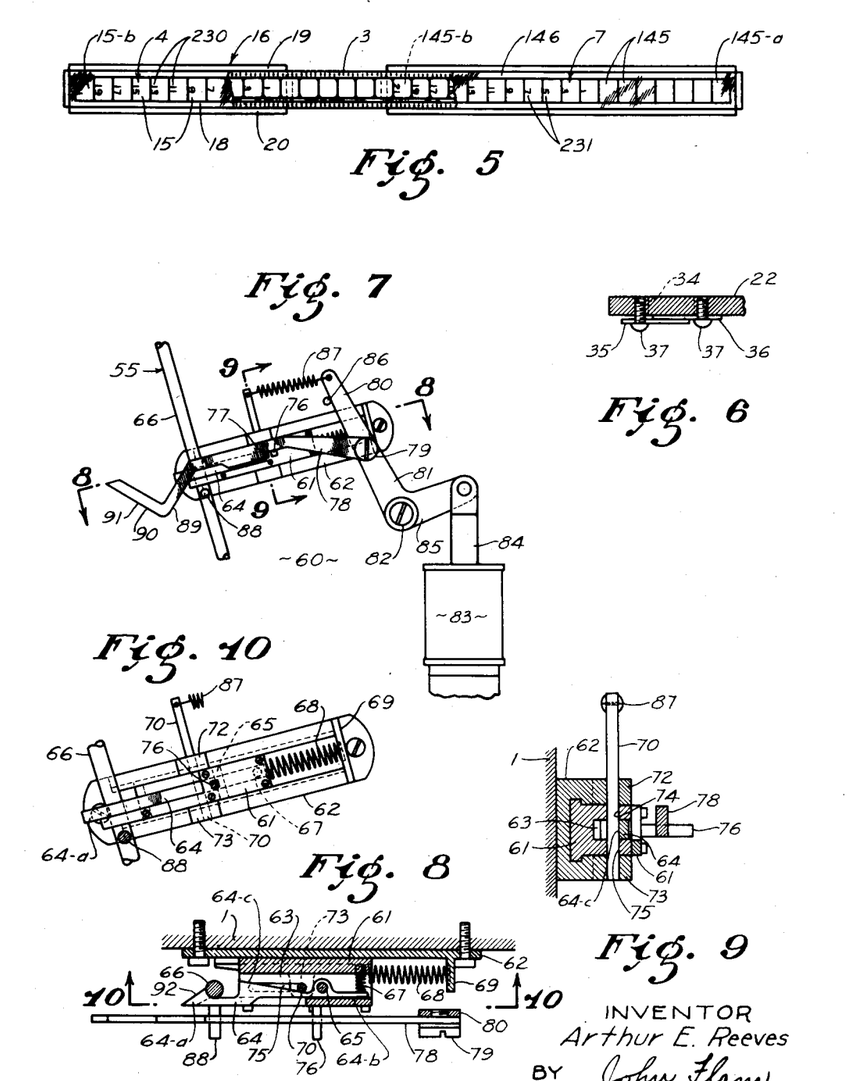
Fig. 5 is a fragmentary plan view on an enlarged scale, seen as indicated by lines 5—5 of Fig. 1.
Fig. 6 is a detail section, taken as indicated by lines 6—6 on Fig. 4.
Fig. 7 is an elevation of the operating means for the means controlling the light source.
Figs. 8 and 9 are detail sections, taken as indicated by the correspondingly numbered lines on Fig. 7.
Fig. 10 is a detail section, taken as indicated by lines 10—10 on Fig. 8.

As previously indicated, the apparatus is intended for use with motion picture film, and, for this purpose, the series of openings 4 comprises a plurality of light wells 15, each having a cross section corresponding with the picture frames on such negative (see Fig. 5). The wells 15 may be formed of sheet metal as a unitary structure 16, extending through an otherwise closed horizontal wall 17 in the housing 1. The top of the wells 15 is closed by a glass plate 18 for slidingly supporting the negative 3, guide rails 19 and 20, (Figs. 2 and 5) being provided for the edges of the negative. By providing sufficiently deep wells, the illumination through each opening 4 is rendered quite uniform.

The amount of light admitted to each well 15 from the source 2 is controlled by an aperture plate 22 (see Figs. 2 and 4) having a plurality of sets of apertures 23, 24, 25, 26 and 27. Each set has an aperture for each well 15, the plate 22 being supported for movement optionally to position any one set to pass light to the wells. Thus, the plate 22 may be slidably mounted in a pair of grooved rails 29 and 30, respectively on the side walls of the housing 1. A notched rod 31 extends out of the housing 1, and carries a knob 32 which is engaged by a spring detent 33, provided for positioning the plate 22. The upper surface of plate 22 is preferably in contact with the bottom edges of wells 15.

The openings in each set vary progressively from a minimum size to a size substantially equal to that of a frame on the negative 3. The apertures may be of fixed size, as for example those of set 24, and vary at some definite rate such, for example, as passing twice as much light as the next smaller opening. Or the effective size of the apertures may be adjustable to permit for example, adjustment to suit special conditions, such as a specific type of printer. Thus, the apertures 34 of the set 23 through the plate 22 may be all equal in size, and quite large. However, each of these openings is covered by a pair of superposed overlapping plates 35 and 36 (see also Fig. 6), having oppositely directed V-notches 35–a and 36–a in their overlapping ends and being secured to plate 22 by screws 37, so that these notches extend over the apertures 34. The heads of these screws overlap the edges of plates 35 and 36. By varying the amount of overlap the size of the opening between the V-notches, 35–a and 36–a and hence the amount of light passed, may be adjusted to suit the requirements.

To vary the character of the light passed by the plate 22, some of the sets of apertures, for example the sets marked 25, 26 and 27 may be provided respectively with filters 40, 41 and 42. Each of these filters may be, for example, a color filter to correct an undesirable effect in the negative 3, and are adapted to be optionally positioned for use by means of the knob 32. Each of the filters 40, 41, and 42 may comprise a light transmitting strip of suitable character, detachably supported by grooved rails 43 on the lower side of the plate 22. In this way, filters of different characteristics may be readily employed.

It is to be understood that adjustable openings, such as provided by the set 23, may be utilized in the other aperture sets, if desired, and further that additional light filters, such as 40, etc., may be employed, so that no unfiltered light passes plate 22.

A ground glass plate 44 (Figs. 1 and 2) is shown as supported just below the aperture plate 22 to diffuse the light entering the light wells 15. This plate may conveniently be supported by grooves in guides 29 and 30. A supplemental filter 45 is mounted below the plate 44, and is pivotally mounted so as to be readily placed in the light path from source 2, or to be positioned clear thereof. A handle 45–a (Fig. 1) may be provided for angularly moving filter 45 to position it either in or out of the light path.

Thus, the filter 45 may be used optionally for those apertures, such as in sets 23 and 24, which have no filters, or to supplement any of the filters 40, 41, or 42.

The light source 2 is shown as comprising an electric lamp 50, such, for example, as one that is energized continuously, while the apparatus is in use. The lamp 50 (Figs. 1 and 2) is mounted in the lower part of the housing 1 beneath a horizontal partition 51 having a light transmitting opening 52 above the lamp 50. A filter pack 53 may be provided for correcting the light from the lamp 50, if necessary, and a shutter or blade 54 serves normally to prevent light passage through the opening 52.

The shutter 54 is operable to uncover the opening 52 and thus expose the film 8 to the illumination from the lamp 50, and is arranged to determine accurately the duration of such exposure.

For this purpose, the blade 54 is secured to the lower end of a pendulum 55, which is mounted pivotally by an antifriction bearing structure 56 on the back wall of the casing 1. To adjust the period of the pendulum and thus alter the duration of the film exposure, the pendulum has an extension 57 above the bearing 56 upon which is mounted a counter-weight 58 for adjustment toward and away from the bearing 56.

The normal position of the pendulum 55, preventing passage of light, is shown in full lines in Fig. 1, the pendulum 55 being retained in this position by latch mechanism 60 (see also Figs. 7–10). When released, the pendulum 55 swings to the left, substantially to the broken line position 55–A and then returns, causing the shutter 54 to uncover the opening 52 and then to cover it again.

As is well understood, a pendulum such as 55 will not quite return to its point of release. Accordingly, the latch mechanism 60, just before it is released, is arranged to swing the pendulum a short distance to the right, from its normal position to the broken line position 55–B, thus ensuring the pendulum's return to the normal, full line position.

Referring to Figs. 7–10, the mechanism 60 includes a movable member 61 supported for sliding movement in the direction in which the pendulum 55 moves, when near its normal position, by a guide member 62 secured to the back wall of the housing 1. The member 61 is of U-shaped cross section having a longitudinally extending center space 63 for accommodating a latch member 64, which is pivotally mounted on a pin 65 carried by the member 61, and passing through the space 63.

The latch member 64 has a forward extension provided with a hook 64-a for engaging the pendulum rod 66, and a rearward extension 64-b engaged by a compression spring 67. The member 64 is urged about the pin 65 into pendulum-engaging position by the spring 67.

Another compression spring 68, confined between the rear of the member 61 and a lug 69 on the guide member 62, urges the member 61 forwardly against a stop provided by pin 70. This pin 70 is mounted in ears 72 and 73, formed on opposite sides of the guide member 62, and extends through the member 61. Slots 74 and 75 are formed in the member 61, on opposite sides of the space 63, for accommodating the pin 70. As clearly shown in Figs. 8 and 10, pin 70, by engaging the rear end of slots 74 and 75, limits outward movement of the member 61. These figures, 8 and 10, show the normal positions of the parts which serve, by engagement of the hook 64-a with the pendulum rod 66, to maintain the pendulum 55 in its normal position.

Movement of member 61 to the right serves to move the pendulum to its releasing position 55-B (Fig. 1) and thereafter causes the latch 64 to release the pendulum rod 66. For this purpose, the latch 64 has a cam surface 64-c, which is adapted to engage the fixed pin 70, and swing the latch 64 outwardly (downwardly in Fig. 8) about pin 65 upon a predetermined movement of member 61 to the right. This causes the hook 64-e to move out of engagement with the rod 66, and the pendulum is then free to swing to the left.

For moving the member 61 to pendulum releasing position, a projection 76 is formed on the member 61 for engagement by a tooth or notch 77 on an operating arm 78 pivoted at 79 on one arm 80 of a bell crank 81. This bell crank 81 is pivotally mounted on the back wall of the housing 1, as by a shoulder screw 82, and is arranged for operation by a solenoid 83. The armature 84 of this solenoid is suitably connected to the other bell crank arm 85.

When the solenoid 83 is deenergized the bell crank 81 is maintained against a stop 86, (Fig. 7), as by a tension spring 87 secured to the end of the arm 80. In this position the arm 78 rests on the projection 76 with the tooth 77 in position to engage the projection 76, (see Fig. 7). Upon energization of the solenoid 83, the bell crank 81 is swung clockwise, causing tooth 77 to engage the projection 76 and move the member 61 to the right until the pendulum 55 is released. As the pendulum 55 swings to the left, a pin 88 carried by the pendulum rod 66 engages on inclined cam surface 89 formed on a downward extension 90 of the free end of the arm 78, and swings the arm 78 upwardly to disengage the tooth 77 from projection 76. This allows the member 61 and latch 64 to return to their normal positions under the influence of spring 68.

On the return swing of the pendulum 55, the pin 88 engages an oppositely inclined cam surface 91 on the lever extension 90, raising the extension to permit passage of the pin 88. As the pendulum 55 approaches its normal position, the rod 66 contacts the inclined face 92 of the hook 64-a, swinging the latch 64 about its pivot 65 to permit passage of the rod 66 and engagement thereof by the hook 64-a. This completes a cycle of operation by the pendulum.

It will be apparent that, soon after the pendulum 55 is released, the blade 54 uncovers the light aperture 52, and that the aperture 52 remains uncovered until the pendulum 55 has returned nearly to its normal position. Since the position of release and the normal latched position are accurately located, the interval of time during which the aperture 52 is uncovered and the film 8 exposed is determined by the period of the pendulum 55, and thus maintained with great accuracy in accordance with the adjustment of the pendulum.

The mechanism 9 for handling the raw film 8 will now be described. Since this film 8 is color sensitive it will not tolerate exposure to light of any kind. Accordingly, the negative 3 enters and leaves the housing 1 through openings 100 (Figs. 1 and 3) provided in the opposite side walls thereof and rendered light tight in a conventional manner, as, for example, by pairs of cooperating spring pressed felt rollers diagrammatically indicated at 101 and 102. The negative 3 passes into the housing 1 between the rollers of one pair, thence onto the glass plate 18 covering the light wells 15, and out of the housing 1 between the rollers of the other pair.

Figures 2, 3, 4:
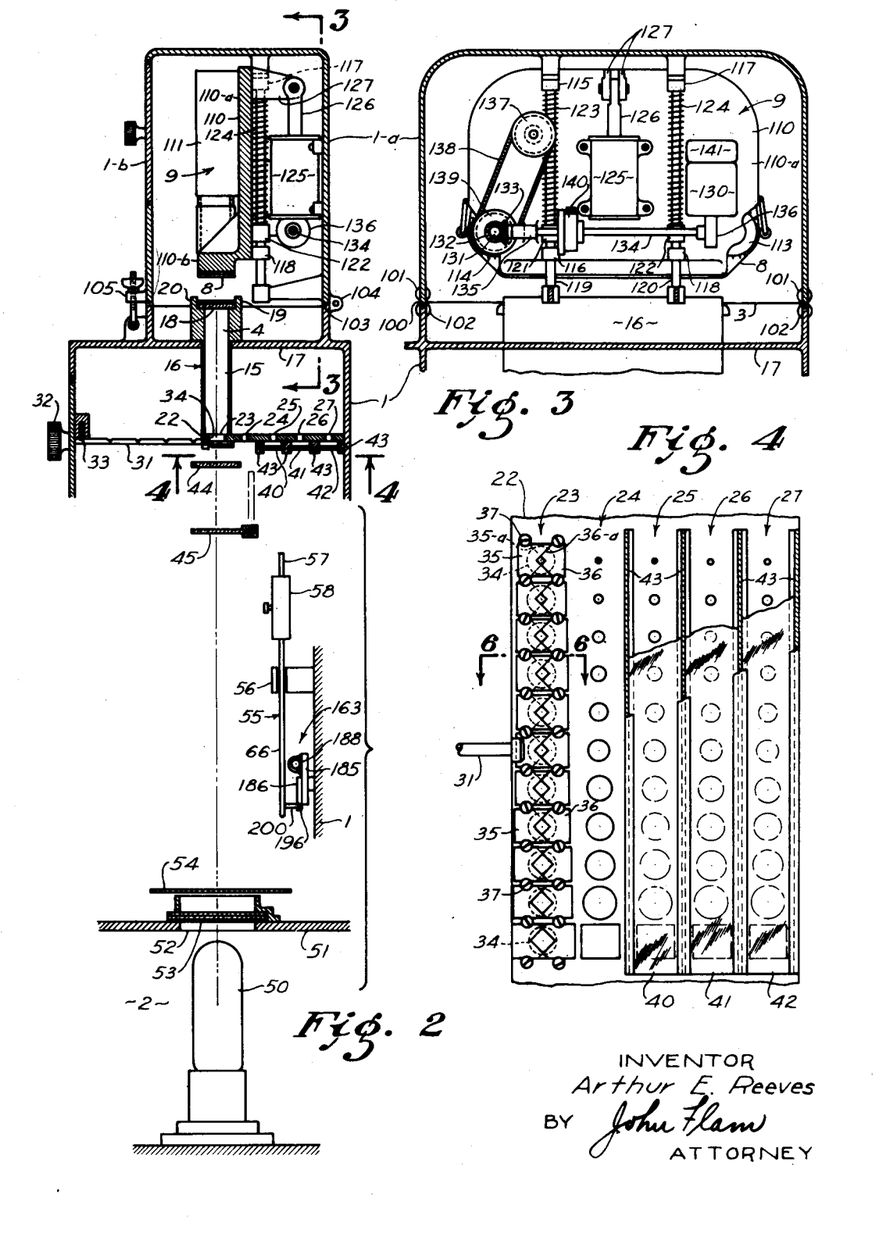
Fig. 2 is a vertical section, largely schematic, taken as indicated by lines 2—2 of Fig. 1, and on an enlarged scale, parts of the figure being broken away to reduce its size.
Fig. 3 is a fragmentary transverse section, taken as indicated by lines 3—3 of Fig. 2.
Fig. 4 is a bottom view on an enlarged scale of one of the light control elements, seen as indicated by lines 4—4 of Fig. 2.

To facilitate access to the mechanism 9, for example, to remove the exposed film 8 and load unexposed film, the upper part of the housing 1, in which this mechanism 9 is positioned, is arranged to open. As shown in Figs. 2 and 3, this upper part or head indicated by 1-a, is separated from the main part of the housing by a light tight joint 103, lying substantially in the plane of the negative 3. Additionally, the head 1-a may be provided with one or more access doors 1-b in its front wall.

The head 1-a is preferably hinged, as at 104, and may be provided with conventional clamps or other means 105 to maintain it in closed position. The upper light sealing rollers 101 are mounted in the head 1-a, so that, when the head is swung to open position, the negative 3 may be readily placed in position on the printing openings 4 or removed from the housing.

The mechanism 9 comprises a frame 110 having a vertically extending plate 110-a upon which are detachably mounted conventional light tight film magazines 111 and 112. The magazine 111 contains the unexposed portion of the film 8, the film extending from the magazine over an idler sprocket 113, and thence along the under surface of a pressure foot 110-b on the lower part of the frame 110 to a driven sprocket 114, and thence into the other magazine 112.

The foot 110-b has a length somewhat greater than that of the light well structure 16 and a width substantially equal to that of the film. Further, the frame 110 is supported above the printing structure 16 for movement to bring the raw film 8 into contact with the negative 3, or to space the foot 110-b above the negative 3 to allow the film 8 to be advanced.

For this purpose, the frame 110 has pairs of spaced bosses 115, 116 and 117, 118 formed on the back thereof, which are slidable respectively on vertically disposed guide rods 119 and 120, suitably supported in the head 1-a. The rods 119 and 120 have collars 121 and 122 fixed thereon respectively. These collars support compression springs 123 and 124 which, by engagement with the upper bosses 115 and 117, resiliently maintain the frame 110 in its upper or inactive position.

Means are provided for urging the frame 110 downwardly into printing position. This means comprises a solenoid 125 secured to the back wall of the head 1-a and having an armature or plunger 126 pivotally secured to a pair of projecting ears 127 on the frame 110. The solenoid 125, upon energization, pulls the frame 110 downwardly, against the force of springs 123 and 124, to printing position; when the solenoid is deenergized, the frame is returned to its upper, inactive position by the springs 123 and 124.

A small electric motor 130, mounted on the back of the frame 110, serves to advance the film 8. Thus, the driving sprocket 114 is fixed on a shaft 131 rotatably mounted in the frame 110, and having a bevel gear 132 secured thereon in back of the frame 110. This gear 132 meshes with a gear 133 secured on a shaft 134 extending lengthwise along the back of the frame, and supported at one end by a bearing 135 on the frame 110. The motor 130 drives the shaft 134 through suitable reduction gearing enclosed in a casing 136, which casing provides a bearing for the adjacent end of the shaft 134.

As is common practice, the magazine 112 receiving the exposed film 8 has an arbor or spindle (not shown) on which the film is wound, such spindle having an extension through the plate 110-a, carrying a pulley 137 connected by a friction belt 138 with a pulley 139 on the driving sprocket shaft 131. In this way, the exposed film is wound in the magazine 112 as it is advanced by the sprocket 114. Belt 138 may be formed of a fine coiled spring.

A cam operated gang switch, generally indicated by 140, and which will be described in detail hereinafter, serves, among other things, to control the motor 130. The arrangement is such that, when the frame 110 returns to its upper inactive position, the motor 130 is energized, and continues energized until it has driven the shaft 134 one complete turn, after which the motor is deenergized. The bevel gears 132 and 133 are so proportioned, with respect to the diameter of the driving sprocket 114, that one turn of the shaft 134 serves so to advance the film 8 that the exposed portion on the pressure foot 110-b is replaced by unexposed film.

To ensure against overrunning of the motor 130 after deenergization, and resultant waste of film 8, it may be desirable to provide a magnetic brake indicated at 141. Such brakes for stopping a motor upon deenergization are well known and commercially available.

Referring to the viewing apertures 7, these serve, in addition to permitting inspection of the negative 3, to facilitate its location so that the frames thereon properly register with the light wells 15 (Figs. 1 and 5). Thus, the viewing apertures comprise a series of light wells 145 substantially identical with the light wells 15, corresponding in size with the frames on the negative 3. These wells 145 are closed at their upper end by a glass plate 146, appropriately held in grooved guides along which the negative 3 is guided, and are lighted through a translucent or ground glass plate 147 by a suitable source 148. Guide rollers 149 may be provided at that end of the plate 146 remote from the head 1-a.

The light wells 145 are spaced from the light wells 15 by a distance equal to a whole number of frames on the negative 3. Thus, when frames on the negative on the viewing apertures 7 are in register with the wells 145, the frames on the printing openings 4 will likewise be in register with the wells 15.

To determine that a given sequence of negative frames are in register with the wells 15 for printing, the number of the wells 145 may exceed by one the number of wells 15, plus the number of frames represented by the distance between the series of wells 15 and the series of wells 145. A much larger section of film 3 than is required to be printed at one time is viewed through wells 145, and the operator cam determines which portion of that section be desired to be tested. Thus, referring to Figs. 1 and 5, upon movement of the negative 3 toward the left to position that frame originally in register with the right-hand viewing well 145-a in register with the left-hand viewing well 145-b, the frame originally registering with the left-hand viewing well 145-b will register with the left-hand printing well 15-b. Additional frames will also register with the other printing wells, in accordance with the number of wells in each series, as well as in the distance between the series.

As shown, there are eleven wells 15, in the printing series 4, and the spacing from the viewing series 7 equals six frames. There are thus eighteen wells 145 in the viewing series 7. Accordingly, upon movement of the negative 3 as just described, the eleven frames at the left-hand end of the sequence will be in printing position.

In Fig. 1, the viewing apertures 7 are to right of the housing 1. Thus, the negative 3 may be fed from right to left as the testing progresses; that is, the negative is wound from the reel 5, viewed or inspected at the apertures 7, thence advanced into position on apertures 4 for test printing, and thereafter wound on reel 6.

Obviously, the viewing apertures 7 may be located on the left-hand side of the housing 1, in which case the film will progress from left to right as the testing proceeds. If desired, the negative 3 may be wound from left to right, with the arrangement shown. In this case, the negative 3 is unwound from the reel 6, passed over the series of apertures 4 and 7, and wound on the reel 5. When a portion is observed which it is desired to test, the direction of motion is reversed to place the portion in printing position over the apertures 4.

It is necessary that the raw film 8 be in proper printing relation with the negative 3 before being exposed, and that the light be interrupted before the film is moved. Additionally, it is desirable to avoid double exposure of any part of the film 8. Accordingly, an electrical system is provided for ensuring a proper sequence of operations, initiated by operation of a push button.

Figure 11:
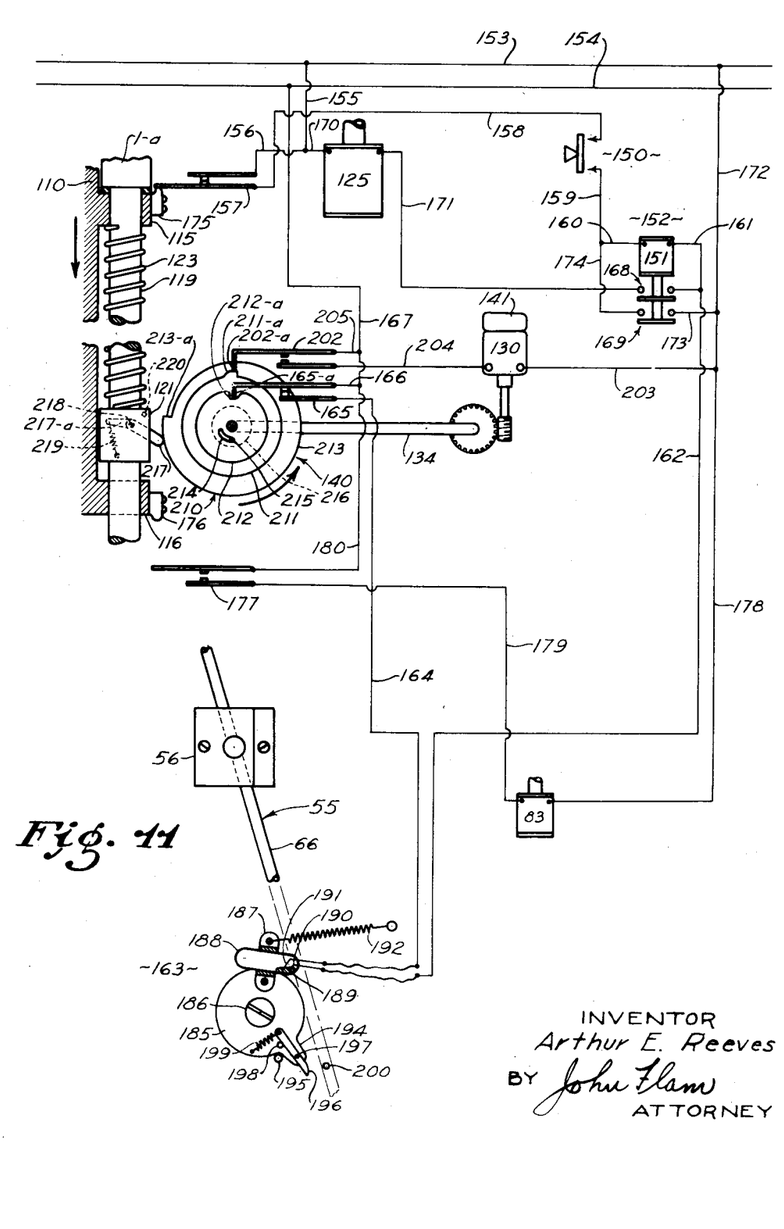
Fig. 11 is a diagram showing the control circuit for the apparatus.

Referring to Fig. 11, a normally open push-button operated switch is indicated by the numeral 150. When closed, the switch 150 serves to connect the winding 151 of a relay 152 across a pair of power mains 153 and 154, provided certain safety and operating switches are closed, which is their normal condition. This circuit may be traced as follows: from the main 153, via leads 155, 156, safety switch 157, lead 158, the push-button switch 150, leads 159, 160, winding 161, leads 161, 162, operating switch 163, lead 164, switch 165 of the gang switch 140, and leads 166, 167 to main 154.

The relay 152 has a pair of contacts 168 controlling the solenoid 125, and a pair of holding contacts 169 paralleling the push-button switch 150, and which are closed upon energization of the winding 151. The solenoid 125 is then energized as follows: from the main 153, leads 155, 170, solenoid 125, lead 171, contacts 168, and thence to main 154 via lead 162, switch 163, lead 164, switch 165, and leads 166, 167. The holding circuit may be traced as follows: from main 153, leads 172, 173 contacts 169, leads 174, 160, winding 151, and thence to main 154 via leads 161, 162, etc., as before. Thus, when the push-button switch 150 is released, the relay 152 remains closed, maintaining the solenoid 125 energized so long as switches 163 and 165 are closed.

When energized, the solenoid 125 moves the printer frame 110 downwardly from its upper, inactive position. As shown in Fig. 11, one of the upper bosses 115, on frame 110, carries a projection 175 which maintains the safety switch 157 closed only, when the frame 110 is in its upper position. Accordingly, as soon as the frame 110 has moved downwardly a short distance, switch 157 is allowed to open. This opens the connection between main 153 and the push-button switch 150, so that the switch 150 loses control of the relay 152 which, however, is maintained closed by the holding circuit just described. Accordingly, it is not possible to interfere with the proper operation of the apparatus by holding the switch 150 closed.

As the frame 110 reaches its lower or active position, placing the film 8 in proper printing relation with the negative 3, a projection 176 on the frame boss 116 closes the normally open switch 177. To permit accurate timing of the switch opening with respect to the position of the frame 110, the projection 176 is vertically adjustable on the boss 116. Closing of switch 177 causes energization of the pendulum releasing solenoid 83 as follows: from main 153, leads 172, 178, solenoid 83, lead 179, switch 177, and leads 180, 167 to main 154.

Energization of the solenoid 83 operates the latch mechanism 60 to release the pendulum 55 for movement to cause the shutter 54 to open and then close, as previously described. Upon return of the pendulum 55 to its normal position, the switch 163 is momentarily opened, breaking the previously described connection between winding 151 and main 154, which allows the relay 152 to open and deenergize the solenoid 125.

When the solenoid 125 is deenergized, the frame 110 starts upward from its printing position, which movement obviously should not occur until the pendulum 55 has returned to its normal position, preventing passage of light to the film 8. Accordingly, the switch 163 is arranged to be unaffected by movement of the pendulum 55 away from its normal position.

Referring to Fig. 11, the switch 163 comprises a disc-like member 185, pivotally mounted at 186 to the back wall of the housing 1 below the pivotal support 56 of the pendulum 55. The member 185 has an upward extension 187 carrying a closed tube 188 of suitable insulating material, such as glass, containing a small pool of mercury 189. A pair of electrodes 190 and 191 extend through the tube 188 at the right-hand end so as to be bridged by the mercury when the tube 188 is inclined toward said end. When the tube is oppositely inclined, the mercury 189 flows to the other end of the tube and the electrodes 190, 191 are disconnected. This is a common form of mercury switch.

A light tension spring 192 urges the member 185 clockwise, so that a lower extension 194 thereon engages a stop pin 195. This is the normal closed position of the switch, the mercury 189 bridging the contacts 190, 191. A trip lever 196 is pivoted at 197 on the extension 194, being urged counter-clockwise about the pivot 197 against a stop 198 on member 185 by a tension spring 199. The trip lever 196 extends radially beyond the extension 194, so as to be engaged by a pin 200 extending from the pendulum rod 66.

When the pendulum 55 swings to the left, from its normal position, pin 200 engages the right-hand side of lever 196 which swings clockwise about its pivot 197 to permit the pin 200 to pass, member 185 and tube 188 remaining in circuit-closing position. When the pendulum 55 returns from the right to its normal position, pin 200 engages the left-hand side of the lever 196 which, being stopped against counter-clockwise movement by engagement with the stop 198, causes member 185 to swing counter-clockwise through a sufficient angle to allow the pin 200 to pass the lever 196. Thereupon, the member 185 is returned to its normal position by the spring 192. This counter-clockwise movement of the member 185 serves to cause the mercury 189 to leave the electrodes 190 and 191 for a brief interval, deenergizing the winding 151 and allowing the relay 152 to open.

Upward movement of the frame 110 opens the switch 177, deenergizing solenoid 83 and allowing bell crank 81 and operating lever 78 of the latch mechanism 60 to return to normal position. As the frame 110 reaches its upper position, a switch 202 is closed for energizing the film winding motor 130, circuit being traced as follows: from main 153, leads 172, 203, motor 130, lead 204, switch 202, leads 205, 167, to main 154.

The switch 202 is incorporated with switch 165 in the gang switch 140, which will now be described (see Fig. 11). A cam member 210 of insulating material is rotatably mounted on the shaft 134. This member 210 has axially spaced, concentric cylindrical cam surfaces 211 and 212 formed thereon, the surface 211 having a raised cam surface 211-a of limited angular extent, the surface 212 having a depressed cam surface 212-a of limited angular extent. An additional cam surface 213, having a tooth or step 213-a, is also provided. As shown, these surfaces 211, 212 and 213 are of different diameters, but this is merely to clarify the showing, and they could as well be equal diameters or of other relative diameters than those shown.

The cam member 210 is provided with an arcuate slot 214 cooperating with a pin 215 carried by a disc 216, secured on the shaft 134 to form a lost motion connection between the cam member 210 and the shaft 134. The cam member 210 is shown in the position it occupies upon the completion of a printing cycle; switch 165 is closed, since the operating extension thereof 165-a is in the cam depression 212-a, switch 202 is open, since the operating extension thereof 202-a is engaged by the raised cam surface 211-a, and the step 213-a is facing upwardly, adjacent the fixed collar 121.

An actuator 217 for the switch 140 is pivoted at 218 on the collar 121. A tension spring 219 engages an extension 217-a of the actuator 217 and urges the actuator in a counter-clockwise direction. As previously mentioned, the shaft 134 is mounted on the frame 110, together with the motor 130 and the gang switch 140. Thus, as the frame 110 moves down, the step 213-a moves past the actuator 217, which thereupon swings counter-clockwise to engage the stop 220, and assumes a position for operating the cam member 210 upon return movement of the frame 110.

Upon return movement of the frame 110, the actuator 217 engages the step 213-a just before reaching its upper limit of movement, and rotates the cam member 210 through a small angle on the shaft 134, such movement being permitted by the slot and pin connection 214, 215. The parts are so proportioned and arranged that sufficient angular movement is imparted to the member 210 to cause cam surface 211-a to allow switch 202 to close, energizing the motor 130, and to cause cam surface 212-a to open switch 165.

After the shaft 134 has been turned through an angle equaling the angular advance of the member 210 by the actuator 217, pin 215, by engaging the end of slot 214, rotates the cam member through one turn, whereupon the switch 202 is opened, deenergizing the motor 130, and switch 165 is closed. As the cam member 210 rotates, the actuator 217 drags on the cam surface 213 with a slight force due to the spring 219, and swings clockwise about its pivot 218 as the cam surface is of increasing radius.

When the frame 110 reaches its upper inactive position, projection 175 closes the switch 157, restoring control of the apparatus to the push-button 150. The switch 165, when open, prevents energization of the relay winding 151. Thus, it ensures that a cycle of operations, once started, must be completed before starting another cycle, preventing double exposure of any portion of the film 8.

In using the apparatus, the negative 3 is inspected by the aid of the viewing apertures 7, and a chosen sequence of frames is then positioned for printing, as previously explained. One or more prints are then made on the film 8, employing various color filters. After exposure and development, the film 8 is inspected to judge the quality of the negative, as well as the suitability of the various light apertures and filters employed for correcting the negative. The quality of the film 8, and its response to various light conditions, may also be judged.

To aid in determining the size of aperture used for a given frame, the glass plate 18 over the light wells 15 has identifying indicia thereon, indicated at 230 in Fig. 5, for the various apertures, which indicia will appear on the film 8 when finished. Corresponding indicia 231 may be provided for the light wells 145 to enable the user to correlate a given frame with a given well 15.

The inventor claims:

1. In apparatus of the character described: means for locating negative film in a predetermined position; a support for raw film; means for shifting said support to place said raw film in printing relation to the negative film; a source for passing light to said negative film; a shutter for preventing passage of light from said source to the negative film; electromagnetically operated means for controlling the movement of said shutter; a circuit for said electromagnetically operated means; and means operable upon arrival of said support in film printing position for controlling said circuit to effect shifting of said shutter from the path of light from said source.

2. In apparatus of the character described: means for locating negative film in a predetermined position; a support for raw film; means for shifting said support to place said raw film in printing relation to the negative film; a source for passing light to said negative film; a shutter for preventing passage of light from said source to the negative film; electromagnetically operated means for controlling the movement of said shutter; a circuit for said electromagnetically operated means; said circuit being completed by said support upon arrival of said support in film printing position.

3. In apparatus of the character described: means for locating negative film in a predetermined position; a support for raw film; electromagnetically operated means for shifting said support to place said raw film in printing relation to the negative film; a circuit for said electromagnetically operated means; a source of light for said negative film; a shutter for controlling passage of light from said source to said negative film; means for effecting opening of said shutter in response to the arrival of said support to film printing position; and means for controlling the circuit to said electromagnetically operated means to effect shifting of said support from film printing position upon return of said shutter to closed position.

4. In apparatus of the character described: means for locating negative film in a predetermined position; a support for raw film; electromagnetically operated means for shifting said support to place said raw film in printing relation to the negative film; a circuit for said electromagnetically operated means; a source of light for said negative film; means for determining passage of light from said source to said negative film; and means for controlling the circuit to said electromagnetically operated means to effect shifting of said support from film printing position upon interrupting of light from said source.

5. In apparatus of the character described: means for locating negative film in a predetermined position; a support for raw film; electromagnetically operated means for shifting said support to place said raw film in printing relation to the negative film; a first circuit for said electromagnetically operated means; a source of light for said negative film; a shutter for preventing passage of light from said source to the negative film; a second circuit including electromagnetically operated means for controlling the movement of said shutter; means operable upon arrival of said support in film printing position to control said second circuit to effect shifting of said shutter to open position; and means operable by said shutter upon its return to closed position for de-energizing said first circuit to effect shifting of said support from film printing position.

6. In apparatus of the character described: means for locating a negative film in a predetermined position; a support for raw film; means for feeding said raw film along said support; electromagnetically operated means for shifting said support to place said raw film in printing relation to the negative film; a circuit for said electromagnetically operated means; and means controlled by said feeding means for holding said circuit open during operation of said feeding means.

7. In apparatus of the character described: means for locating negative film in a predetermined position; a support for raw film; means for feeding said raw film along said support, comprising an electric motor; a first circuit for said motor; electromagnetically operated means for shifting said support to place said raw film in printing relation to the negative film; a second circuit for said electromagnetically operated means; means operated by said feeding means for holding said second circuit open during rotation of said electric motor, said holding means being rendered ineffective upon arrival of said film feeding means at a predetermined position; and means operable by said feeding means upon its arrival at said predetermined position for opening said first circuit.

8. In apparatus of the character described: means for locating negative film in a predetermined position; a support for raw film; means for feeding said raw film along said support, comprising an electric motor; a first circuit for said motor; electromagnetically operated means for shifting said support to place said raw film in printing relation to the negative film; a second circuit for said electromagnetically operated means; means operated by said feeding means for holding said second circuit open during rotation of said electric motor; said holding means being rendered ineffective upon arrival of said film feeding means at a predetermined position; means operable by said feeding means upon its arrival at said predetermined position for opening said first circuit; a source for passing light to the negative film; a shutter for controlling such passage of light; means for effecting opening of said shutter in response to arrival of said support at the film printing position; and means operable by said shutter for effecting opening of said second circuit upon return of said shutter to closed position.

9. In apparatus of the character described: means forming a printing aperture; a movable support for raw film to position said raw film with respect to said printing aperture; a source for passing light to said printing aperture; a shutter for controlling said light source; means responsive to the arrival of said support to printing relation for moving said shutter through one cycle of operation wherein said shutter uncovers said source for a predetermined period; means for advancing said raw film on said support; and circuit means for said film advancing means, including a circuit controller operable upon the retraction of said support away from printing relation.

10. In apparatus of the character described: means forming a printing aperture; a movable support for raw film to position said raw film with respect to said printing aperture; a source for passing light to said printing aperture; a shutter for controlling said light source; means responsive to the arrival of said support to printing relation for moving said shutter through one cycle of operation wherein said shutter uncovers said source for a predetermined period; means for advancing said raw film on said support; circuit means for said film advancing means, including a circuit controller operable upon the retraction of said support away from printing relation; and means cooperating with said circuit controller and operable upon a predetermined movement of said film advancing means to open said circuit controller.

11. In apparatus of the character described: means forming a printing aperture; a movable support for raw film to position said raw film with respect to said printing aperture; a source for passing light to said printing aperture; a shutter for controlling said light source; means responsive to the arrival of said support to printing relation for moving said shutter through one complete cycle of operation, wherein said shutter uncovers said source for a predetermined period; electromagnetic means for moving said support to position said raw film with respect to said aperture; a circuit for said electromagnetic means, including: a switch; a holding circuit for said switch; and means operated by the return of said shutter to source closing position to open said holding circuit and said switch.

12. In apparatus of the character described: means forming a printing aperture; a movable support for raw film to position said raw film with respect to said printing aperture; a source of light adapted to pass light rays to said printing aperture; cyclic means for controlling said source to expose said raw film to light rays for a predetermined time; and means responsive to the arrival of said support to printing relation to initiate the operation of said cyclic means.

13. In apparatus of the character described: means forming a printing aperture; a movable support for raw film to position said raw film with respect to said print aperture; a source of light adapted to pass light rays to said printing aperture; cyclic means for controlling said source to expose said raw film to light rays for a predetermined time; means responsive to the arrival of said support to printing relation to initiate the operation of said cyclic means; electromagnetic means for moving said support to position said raw film with respect to said aperture; a circuit for said electromagnetic means, including a switch; a holding circuit for said switch; and means operated by the cyclic means upon the termination of cyclic exposure of said raw film to said source for momentarily interrupting said holding circuit.

14. In apparatus of the character described: means forming a printing aperture; a movable support for raw film to position said raw film with respect to said printing aperture; a source of light adapted to pass light rays to said printing aperture; cyclic means for controlling said source to expose said raw film to light rays for a predetermined time; means responsive to the arrival of said support to printing relation to operate said cyclic means; electromagnetic means for moving said support to position said raw film with respect to said aperture; a circuit for said electromagnetic means, including a switch; a holding circuit for said switch; means operated by the cyclic means upon the termination of cyclic exposure of said raw film to said source momentarily to interrupt said holding circuit; means for advancing said raw film on said support; and circuit means for said film advancing means, including a circuit controller operable to energize said film advancing means in response to the retraction of said support away from printing relation.

15. In apparatus of the character described: means forming a printing aperture; a movable support for raw film to position said raw film with respect to said printing aperture; a source of light adapted to pass light rays to said printing aperture; cyclic means for controlling said source to expose said raw film to light rays for a predetermined time; means responsive to the arrival of said support to printing relation to operate said cyclic means; electromagnetic means for moving said support to position said raw film with respect to said aperture; a circuit for said electromagnetic means, including a switch; a holding circuit for said switch; means operated by the cyclic means upon the termination of cyclic exposure of said raw film to said source momentarily to interrupt said holding circuit; means for advancing said raw film on said support; circuit means for said film advancing means, including a circuit controller; a cam member for operating said circuit controller; a lost motion connection between said cam member and said film advancing means; and means responsive to the retraction of said support from printing relation to move said cam member to close said circuit controller.

16. In apparatus of the character described: means forming a printing aperture; a movable support for raw film to position said raw film with respect to said printing aperture; a source of light adapted to pass light rays to said printing aperture; cyclic means for controlling said source to expose said raw film to light rays for a predetermined time; means responsive to the arrival of said support to printing relation to operate said cyclic means; electromagnetic means for moving said support to position said raw film with respect to said aperture; a circuit for said electromagnetic means, including a switch; a holding circuit for said switch; means operated by the cyclic means upon the termination of cyclic exposure of said raw film to said source momentarily to interrupt said holding circuit; means for advancing said raw film on said support; circuit means for said film advancing means, including a first circuit controller; a cam member for operating said first circuit controller; a lost motion connection between said cam member and said film advancing means; means responsive to the retraction of said support from printing relation to move said cam member to close said first circuit controller; a second circuit controller for said circuit for said electromagnetic means; and means opening said second circuit controller when said first circuit controller is closed.

ARTHUR E. REEVES.

REFERENCES CITED

The following references are of record in the file of this patent:

UNITED STATES PATENTS

| Number | Name | Date |
|---|---|---|
| 849,184 | Auld | Apr. 2, 1907 |
| 1,357,391 | Freytag | Nov. 2, 1920 |
| 1,382,272 | Davis | June 21, 1921 |
| 1,387,318 | Schulze | Aug. 9, 1921 |
| 1,393,983 | Swinscoe | Oct. 18, 1921 |
| 1,409,628 | Wescott | Mar. 14, 1922 |
| 1,422,665 | Chanier | July 11, 1925 |
| 1,564,722 | Tauern et al. | Dec. 8, 1925 |
| 1,591,118 | Friess | July 16, 1926 |
| 1,604,485 | Salins | Oct. 26, 1926 |
| 1,711,333 | Swenson | Apr. 30, 1929 |
| 1,812,448 | Reilly et al. | June 30, 1931 |
| 1,821,399 | Owens | Sept. 1, 1931 |
| 1,832,294 | Gent | Nov. 17, 1931 |
| 1,881,791 | Maresh | Oct. 11, 1932 |
| 1,883,884 | Doran | Oct. 25, 1932 |
| 2,117,727 | Jones | May 17, 1938 |
| 2,122,689 | Jones | July 5, 1938 |
| 2,134,483 | Killman et al. | Oct. 25, 1938 |
| 2,235,590 | Rockwell | Mar. 18, 1941 |
| 2,271,572 | Rackett | Feb. 3, 1942 |
| 2,303,206 | Garman | Nov. 24, 1942 |
| 2,344,405 | Grover | Mar. 14, 1944 |
| 2,410,237 | Renshaw | Oct. 29, 1946 |

FOREIGN PATENTS

| Number | Country | Date |
|---|---|---|
| 195,651 | Great Britain | May 25, 1923 |
| 220,009 | Great Britain | Aug. 13, 1924 |
| 434,079 | Great Britain | Aug. 26, 1935 |